(12) United States Patent
Muranaka et al.

(10) Patent No.: US 11,966,082 B2
(45) Date of Patent: Apr. 23, 2024

(54) OPTICAL CIRCUIT AND OPTICAL CONNECTION STRUCTURE

(71) Applicant: Nippon Telegraph and Telephone Corporation, Tokyo (JP)

(72) Inventors: Yusuke Muranaka, Musashino (JP); Kota Shikama, Musashino (JP); Hidetaka Nishi, Musashino (JP); Ai Yanagihara, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 479 days.

(21) Appl. No.: 17/276,956

(22) PCT Filed: Sep. 12, 2019

(86) PCT No.: PCT/JP2019/035983
§ 371 (c)(1),
(2) Date: Mar. 17, 2021

(87) PCT Pub. No.: WO2020/059639
PCT Pub. Date: Mar. 26, 2020

(65) Prior Publication Data
US 2022/0035100 A1  Feb. 3, 2022

(30) Foreign Application Priority Data
Sep. 19, 2018 (JP) .................... 2018-175101

(51) Int. Cl.
*G02B 6/30* (2006.01)
*G02B 6/42* (2006.01)

(52) U.S. Cl.
CPC ............ *G02B 6/30* (2013.01); *G02B 6/4214* (2013.01)

(58) Field of Classification Search
None
See application file for complete search history.

(56) References Cited

U.S. PATENT DOCUMENTS

| | | | |
|---|---|---|---|
| 10,268,006 B2 * | 4/2019 | Hsu ...................... | G02B 6/4225 |
| 11,650,381 B1 * | 5/2023 | Polomoff ............. | G02B 6/4243 |
| | | | 385/49 |
| 2004/0012041 A1 * | 1/2004 | West .................... | G02B 6/4201 |
| | | | 257/228 |

(Continued)

FOREIGN PATENT DOCUMENTS

| | | |
|---|---|---|
| JP | 2003-149492 A | 5/2003 |
| JP | 2004-78028 A | 3/2004 |
| WO | 2017/085934 A1 | 5/2017 |

*Primary Examiner* — Jerry Rahll
(74) *Attorney, Agent, or Firm* — Workman Nydegger

(57) ABSTRACT

Optical alignment between an optical waveguide device and an optical connection part is realized easily and at low cost. An optical circuit in which optical waveguides to be connected to optical fibers are formed includes: an alignment optical waveguide configured to be opposed to, on an optical waveguide edge face to which an optical connection part having guide holes for insertion of core wires of the optical fibers is to be fixed, a guide hole into which an alignment optical fiber is to be inserted; and a light path changing member configured to change a path of light to a vertical direction with respect to the optical axis direction of the core of the alignment optical waveguide.

18 Claims, 11 Drawing Sheets

(56) References Cited

U.S. PATENT DOCUMENTS

| | | | |
|---|---|---|---|
| 2004/0033016 A1* | 2/2004 | Kropp | G02B 6/43 |
| | | | 385/31 |
| 2006/0215963 A1* | 9/2006 | Hamano | G02B 6/3897 |
| | | | 385/137 |
| 2011/0194808 A1* | 8/2011 | Kim | G02B 6/29323 |
| | | | 385/88 |
| 2012/0189245 A1* | 7/2012 | Bowen | G02B 6/4214 |
| | | | 385/14 |
| 2014/0270626 A1* | 9/2014 | Isenhour | G02B 6/122 |
| | | | 29/846 |
| 2015/0139589 A1* | 5/2015 | Sakai | G02B 6/138 |
| | | | 385/76 |
| 2018/0088282 A1* | 3/2018 | Hirano | G02B 6/3652 |
| 2018/0196207 A1* | 7/2018 | Hsu | G02B 6/4204 |
| 2018/0217326 A1* | 8/2018 | Brusberg | G02B 6/122 |
| 2018/0335365 A1 | 11/2018 | Kamei et al. | |

* cited by examiner

OPTICAL CIRCUIT AND OPTICAL CONNECTION STRUCTURE

TECHNICAL FIELD

The present invention relates to an optical connection structure for coupling an optical waveguide device and optical fibers, and more particularly to an optical circuit for aligning optical waveguides of the optical waveguide device with the core wires of the optical fibers, and an optical connection structure that includes the optical circuit and an optical connection part.

BACKGROUND ART

Recently, due to an increase in personal traffic consumption in video streaming services and an increase in corporate traffic in the IoT, cloud services, and the like, massive expansion of communication capacity within and between data centers is in demand. In order to meet the demand, introduction of, instead of a conventional short-range communication method using electrical signals, an optical interconnection technique using an optical transmission technique is in progress. In a typical optical interconnection method, transmission is performed between a light emitting element such as a laser diode (LD) and a light receiving element such as a photodiode (PD) that are arranged on a printed circuit board, using optical transmission media such as an optical waveguide and an optical fiber.

Depending on the transmission method, a light modulation element or the like is integrated with or discretely connected to the light emitting element, and as a result of the light emitting element being further connected to e.g., a driver that performs electricity-to-light conversion, signal processing is realized. The light emitting element and the element for signal processing are implemented as an optical transmitter on the printed circuit board. Similarly, an optical functional circuit or the like is suitably integrated with or discretely connected to the light receiving element, and as a result of the light receiving element being further connected to e.g., an electrical amplification circuit that performs light-to-electricity conversion, the light receiving element is implemented as an optical receiver on the printed circuit board. An optical transmitter and receiver obtained by combining these optical transmitter and optical receiver into one piece is mounted inside a package or is mounted on the printed circuit board, and is optically connected to an optical transmission medium such as optical fibers. Furthermore, depending on the topology, the optical transmitter and the optical receiver are optically connected to each other via, for example, a relay such as an optical switch, so that optical interconnection is realized.

The light emitting element, the light receiving element, and the light modulation element are put to practical use by using a semiconductor such as silicon (Si) and germanium (Ge), or a III-V compound semiconductor material represented by indium phosphorus (InP), gallium arsenide (GaAs), and indium gallium arsenide (InGaAs). Recently, an optical waveguide-type optical transmitter and receiver using these materials has been developed in which a silicon optical circuit and an indium phosphorus optical circuit, which have a light propagation mechanism, are integrated. As the light modulation element, in addition to the semiconductors, a ferroelectric system such as lithium niobite (LiNbO$_3$), a polymer series material, or the like may be used. Furthermore, the light emitting element, the light receiving element, and the light modulation element may also be integrated with an optical functional element constituted by a Planar Lightwave Circuit (PLC) made of quartz glass or the like. Examples of the optical functional element include a splitter, a wavelength multiplexer/demultiplexer, an optical switch, a polarization control element, and a light filter. Hereinafter, a device in which a light emitting element, a light receiving element, a light modulation element, and the like, which have a light propagation and waveguide mechanism, and an optical circuit such as an optical functional element and a light amplification element are integrated with each other is referred to as an "optical waveguide device".

For connecting such an optical waveguide device to optical fibers, typically, an optical connection part with V-shaped grooves that is made of a glass material is used. The optical connection part is required to connect the cores of an optical fiber array including a plurality of optical fiber core wires and the cores of a plurality of optical waveguides formed in the optical waveguide device with low loss. Accordingly, it is necessary to perform positioning (hereinafter, referred to as "alignment") between the optical waveguide device and the optical connection part in terms of submicron, and fix them to each other. A conventional optical waveguide device is aligned with an optical fiber array, and is, in the state of being integrated therewith, mounted inside a package or on a printed circuit board. Because handling of optical fibers is complicated, implementing the optical waveguide device requires that the optical waveguide device and the optical fibers are easily aligned with and fixed to each other inside the package or on the printed circuit board.

CITATION LIST

Patent Literature

[PTL 1] Japanese Patent Application Publication No. 2004-78028

SUMMARY OF THE INVENTION

Technical Problem

Conventionally, a user moves an optical waveguide device and optical fibers with respect to each other using a holding/operating device and aligns them at the most appropriate positions, while monitoring the light intensity of light that enters one side of the optical waveguide device or the optical fibers, and exits from the other side (hereinafter, referred to as "optical alignment"). In contrast, a number of methods for easily aligning and fixing an optical waveguide device and optical fibers have been proposed. For example, PTL 1 discloses a simplified method for realizing alignment using mechanical positioning.

FIG. 1 shows a conventional method for connecting an optical waveguide device and optical fibers. Preliminarily, a plurality of guide holes 3 for insertion of the optical fibers that are formed in an optical connection part 1 are aligned with a plurality of optical waveguides 4 of an optical waveguide device 2 by performing optical alignment or the like, and the optical connection part 1 is fixed to the optical waveguide device 2 (hereinafter, referred to as an "optical connection structure"). The optical connection structure is mounted inside a package or on a printed circuit board, and then the optical fibers are inserted into and fixed to the guide holes 3 of the optical connection part 1 (see PTL 1).

FIG. 2 shows a structure of the conventional optical connection part. In the optical connection part 1, a V groove substrate 11 in which a plurality of V grooves 13 are formed, and a plate lid substrate 12 are fixed to each other with an adhesive 14. Dummy fibers 15a and 15b are inserted into some of the V grooves 13, and the hole diameter of the guide holes each formed by one V groove 13 and the bottom of the lid substrate 12 is controlled to a diameter appropriate for insertion of the optical fiber core wires.

FIG. 3 shows a conventional method for aligning the optical waveguide device with an optical fiber. The optical waveguide device 2 has a configuration in which an optical circuit including optical waveguides 22 each constituted by a core 23 and a cladding 24 are mounted on a substrate 21. A reinforcing plate 25 for reinforcing fixation of the above-described optical connection part 1 is attached to an optical waveguide edge face of the optical waveguide device 2, and the optical connection part 1 is fixed thereto. The optical alignment of the optical connection part 1 is achieved by inserting an alignment optical fiber 31 fixed to a plug 32 into the guide hole formed in the optical connection part 1 and causing light to enter the alignment optical fiber 31. The alignment is achieved by monitoring the light exiting from the core 23 of an alignment optical waveguide of the optical waveguide device 2 that is opposed to the guide hole. The fixation position of the optical connection part 1 directly relates to the light propagation properties of an optical transmitter or an optical receiver, and thus high positional accuracy is required.

However, when performing optical alignment, at least two optical fiber core wires on the input side, and at least two optical waveguides on the output side need to be positioned at the same time, and thus the difficulty of alignment is high. Also, the optical connection part for entrance of light, and the optical fibers to be used to monitor the light exiting from the optical waveguides of the optical waveguide device need to be individually aligned with one optical waveguide device, which increases the cost.

In other words, by optically aligning the optical connection part with the optical waveguide device and fixing them to each other in advance, it is possible to mechanically align the optical waveguide device and optical fibers inside a package or on a printed circuit board, but the optical alignment between the optical waveguide device and the optical connection part still has the problem.

Means for Solving the Problem

An object of the present invention is to provide an optical circuit and an optical connection structure for realizing optical alignment between an optical waveguide device and an optical connection part easily and at low cost.

In order to achieve the above-described object, one aspect of the present invention is characterized in that an optical circuit in which optical waveguides to be connected to optical fibers are formed includes: an alignment optical waveguide configured to be opposed to, on an optical waveguide edge face to which an optical connection part having guide holes for insertion of core wires of the optical fibers is to be fixed, a guide hole into which an alignment optical fiber is to be inserted; and a light path changing member configured to change a path of light to a vertical direction with respect to an optical axis direction of a core of the alignment optical waveguide.

Effects of the Invention

According to the present invention, light exiting from the alignment optical waveguide can be detected from the surface and the reverse side of the optical waveguide device, and thus it is possible to realize optical alignment between the optical waveguide device and the optical connection part easily and at low cost.

DESCRIPTION OF EMBODIMENTS

Figure 1:
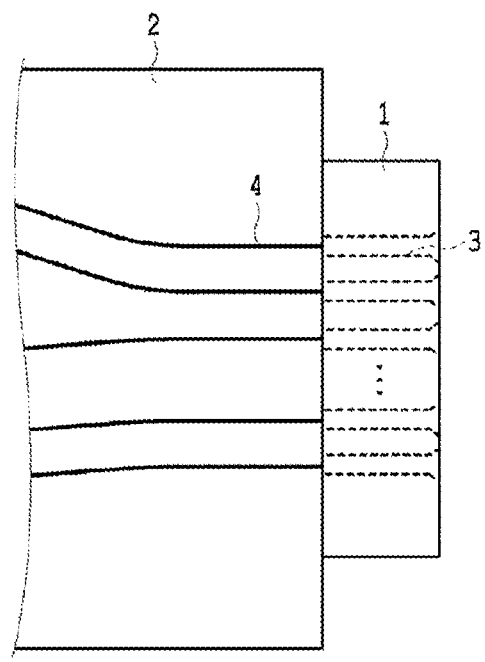
FIG. 1 is a diagram illustrating a conventional method for connecting an optical waveguide device and optical fibers.
Figure 2:
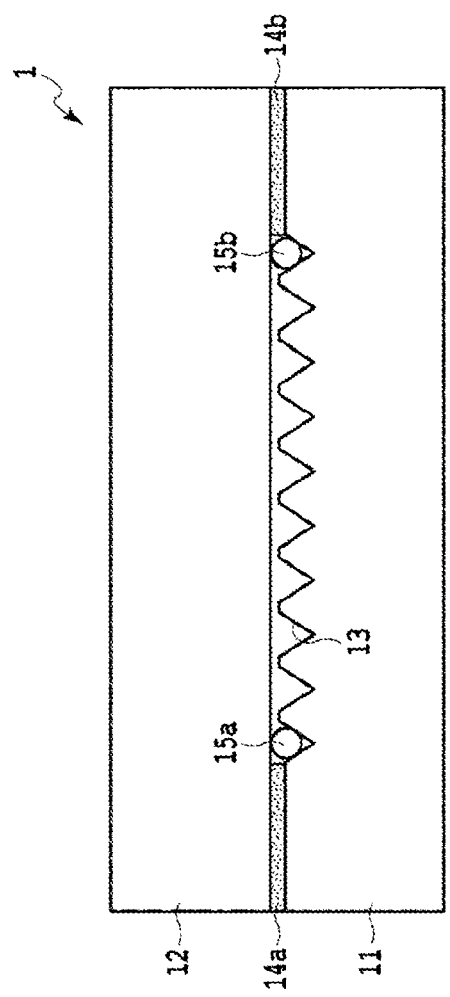
FIG. 2 is a diagram illustrating a structure of a conventional optical connection part.
Figure 3:
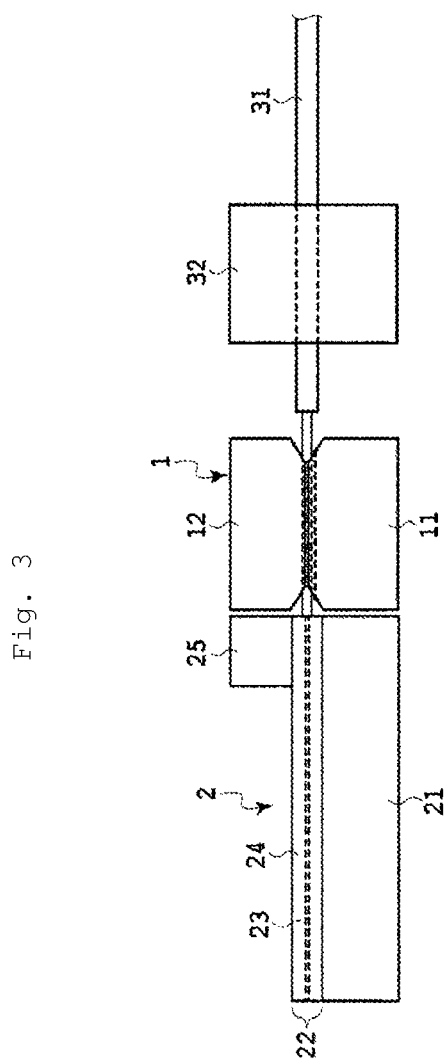
FIG. 3 is a diagram illustrating a conventional method for aligning the optical waveguide device with an optical fiber.

Hereinafter, embodiments of the present invention will be described in detail with reference to the drawings. In the embodiments, as the optical connection part, an optical connection part as shown in FIG. 1 is used. In the optical connection part, the V groove substrate 11 in which the plurality of V grooves 13 are formed, and the plate lid substrate 12 are fixed to each other using the adhesive 14 with the dummy fibers 15a and 15b interposed therebetween. The V grooves have no limitation to the number and pitch thereof, and are applied in various modes. Also, as an optical fiber to be applied, a single-mode optical fiber whose cladding has an outer diameter of 125 μm is used, for example. However, another optical fiber having any outer diameter, core diameter, and fiber type (such as a multi-mode fiber or a polarization maintaining fiber) may be suitably selected as long as it achieves the same effect. Note that the optical connection part suitably employs, for connection, a housing structure, a guide structure, an adhesive, a spring structure, a protection structure, and the like, but illustrations thereof are omitted in the embodiments. These structures may be suitably added to the embodiments depending on the connection usage.

The optical waveguide device is not limited to the above-described optical waveguide device as long as it includes a one-dimensional waveguide array. For example, as an light emitting element, an integrated light emitting element may be used in which a plurality of distributed-feedback laser diodes (DFB-LD) made of InP are mounted, and are optically connected to each other by an optical circuit such as a Si waveguide or a glass waveguide. Also, a light emitting element may be used in which a DFB-LD array is bonded to an optical circuit formed on a Si substrate, and is integrated with Si waveguides. Furthermore, an integrated light emitting element may also be used in which an InP material or the like is bonded to a Si substrate to form a laser layer, and waveguides made of Si waveguides, a Si oxide (such as oxide silicon or a silicon oxynitride film), or the like are integrated therewith. Similarly, as a light receiving element, an integrated light receiving element may be used in which a PD made of InGaAs, Ge, or the like is bonded to a substrate, and is optically connected to and integrated with another optical waveguide device.

Also, an external modulation element or the like may be connected to the light emitting element, or may be made of the same material and integrated on the same substrate, as appropriate. For example, Si waveguides and a modulation element constituted by a thermo-optic switch or an electro-optic switch may also be integrated, or InP waveguides, a modulation element constituted by a thermo-optic switch or an electro-optic switch, and a modulation element made of a ferroelectric such as LN may also be integrated. A structure that has a modulation function due to the electroabsorption effect may also be directly integrated with or formed on the light emitting element. In the embodiments, the modulation elements are omitted. A specific layout of the optical waveguides is also omitted because the present invention is not limited to this.

The material of the V groove substrate and the lid substrate has no limitation with regard to the material quality as long as the V grooves can be formed therein with accuracy. As a representative example, a glass material can be subjected to cutting work or the like, so that the V grooves are formed. Also, the V groove substrate may also be formed by subjecting a Si substrate or the like to anisotropic etching. Similarly, the V grooves can also be formed by an imprint technique using polymer, or sintering of ceramic, for example.

Embodiment 1

Figure 4:
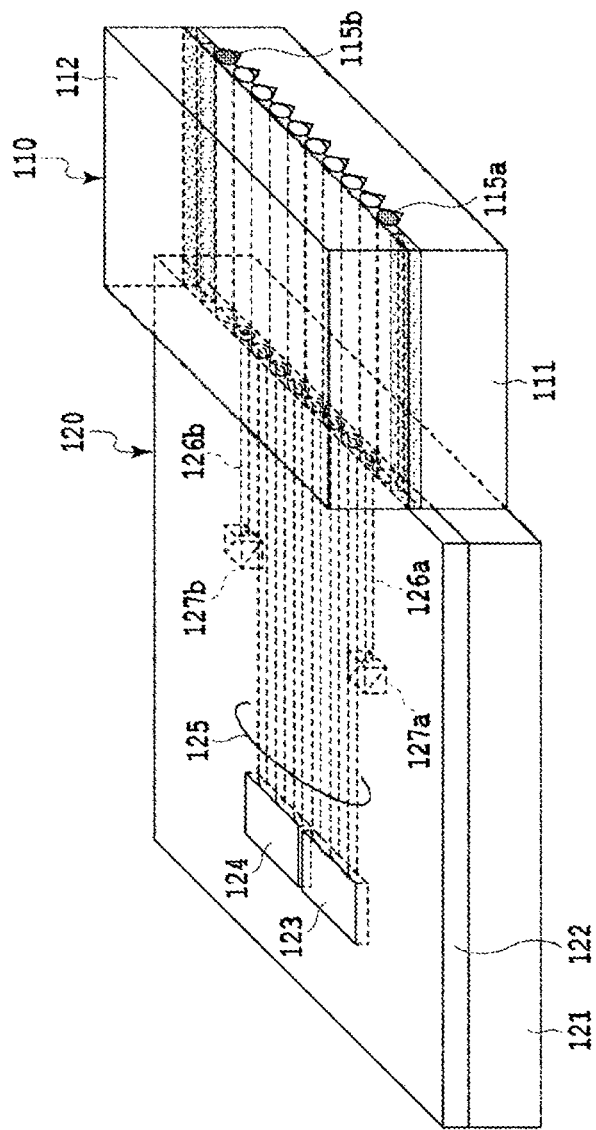
FIG. 4 is a diagram illustrating a method for connecting an optical waveguide device and optical fibers, according to Embodiment 1 of the present invention.

FIG. 4 shows a method for connecting an optical waveguide device and optical fibers according to Embodiment 1 of the present invention. An optical waveguide device 120 includes, on a Si substrate 121, an optical circuit (PLC) 122 that is constituted by optical waveguides each constituted by a core made of Si and a cladding made of $SiO_2$. On the PLC 122, a transmitter array 123 and a receiver array 124 are mounted, and a waveguide array 125 extending from an optical waveguide edge face of the optical waveguide device 120 is connected to the transmitter array 123 and the receiver array 124. As a result of the transmitter array 123 and the receiver array 124 being electrically connected to an element or a terminal provided inside a package or on a printed circuit board, a transceiver for optical interconnection is realized.

An optical connection part 110 is adhered and fixed to the optical waveguide edge face of the optical waveguide device 120, the optical connection part 110 including a V groove substrate 111 with a plurality of V grooves and a plate lid substrate 112 that are joined to each other. Dummy fibers 115a and 115b are inserted into some of the V grooves. Note that illustration of a reinforcing plate arranged on the optical waveguide device 120 is omitted. After the optical connection structure in which the optical waveguide device 120 and the optical connection part 110 are fixed to each other is mounted inside a package or on a printed circuit board, an implementer of the present invention can insert optical fiber core wires of an optical fiber array into guide holes of the optical connection part 110, thereby optically coupling the optical fiber array and the optical waveguide array 125 of the optical waveguide device 120.

As described above, the light emitting element, the light receiving element, the light modulation element, the optical functional element, and the light amplification element of the optical waveguide device 120 may have any number of channels, any configuration, and any material, and any method such as an integration method may be used for them.

Conventionally, an alignment optical waveguide for use in optical alignment is a through-type optical waveguide that extends from the optical waveguide edge face of an optical waveguide device to the opposite edge face, so that a monitoring optical fiber for monitoring exiting light can be connected thereto. However, as shown in FIG. 4, the through-type optical waveguide is not preferable depending on the configuration of the optical functional element of the PLC 122 that is connected to the transmitter array 123 or the receiver array 124, because crossing of waveguides, an increase in the dimension of the optical circuit, and the like may occur. Also, in the case of the through-type optical waveguide, when light exiting from the alignment optical waveguide is monitored, light that was not coupled to the optical waveguide, such as a slab mode of the optical functional element formed on the PLC 122 and stray light, is detected from the alignment optical waveguide, resulting in an increase in difficulty in alignment.

Figure 5:
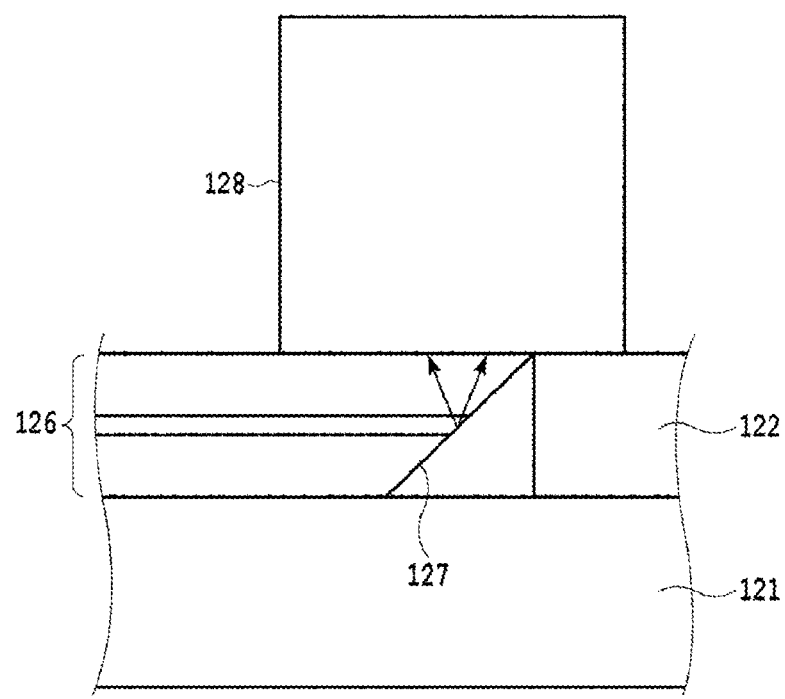
FIG. 5 is a diagram illustrating a structure of an alignment optical waveguide according to Embodiment 1.

FIG. 5 shows a structure of the alignment optical waveguide according to Embodiment 1. Alignment optical waveguides 126a and 126b of Embodiment 1 are provided at two ends of the optical waveguide array 125, and respectively connect the optical waveguide edge face of the optical waveguide device 120 to a flip-up reflection mirror 127a formed on the PLC 122, and connect the optical waveguide cross-section to a flip-up reflection mirror 127b. The flip-up reflection mirrors 127 have an inclined surface of 45 degrees with respect to the optical axis direction of the cores of the alignment optical waveguides 126, and are formed with a shape of etching performed on the bottom of the PLC 122. Light that has entered the alignment optical waveguides 126 is received on the surface of the optical waveguide device 120, and can be detected by providing, for example, light receiving elements 128. Note that the structure of the reflection mirrors is not limited to that of the mirrors having an inclination of 45 degrees formed with the etching shape as long as they have a structure that can scatter light onto the device surface. The mirrors may have any aspect as long as they have a structure that can emit light in a vertical direction with respect to the device surface.

As a result of the alignment optical waveguides 126 being provided with the flip-up reflection mirrors 127, it is possible to reflect light upward at appropriate positions on the surface of the optical waveguide device 120, and thus it is not necessary to route the alignment waveguides 126 across the inner area of the PLC 122. Also, there is no need of forming an exit edge face as is common for a through-type optical waveguide, and thus it is possible to realize a reduction in the implementation cost and downsizing of the device.

Figure 6:
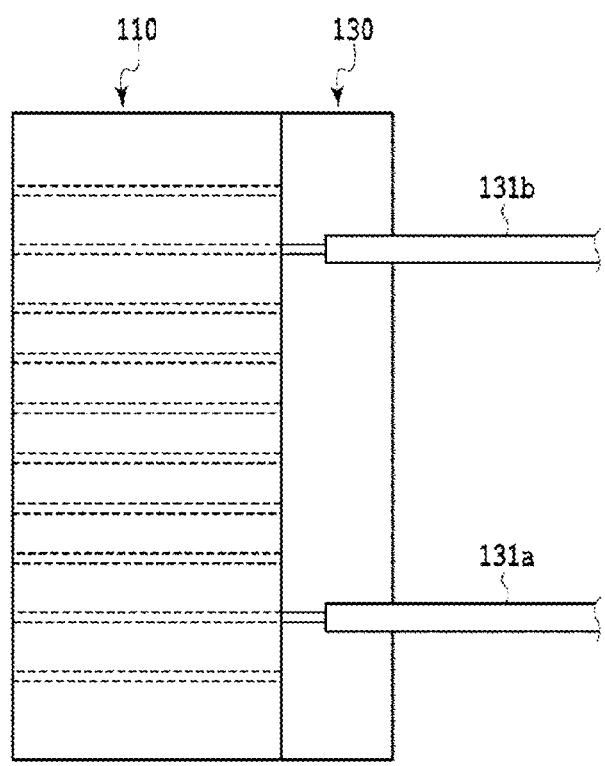
FIG. 6 is a diagram illustrating a method for fixing alignment optical fibers to the optical connection part.
Figure 7:
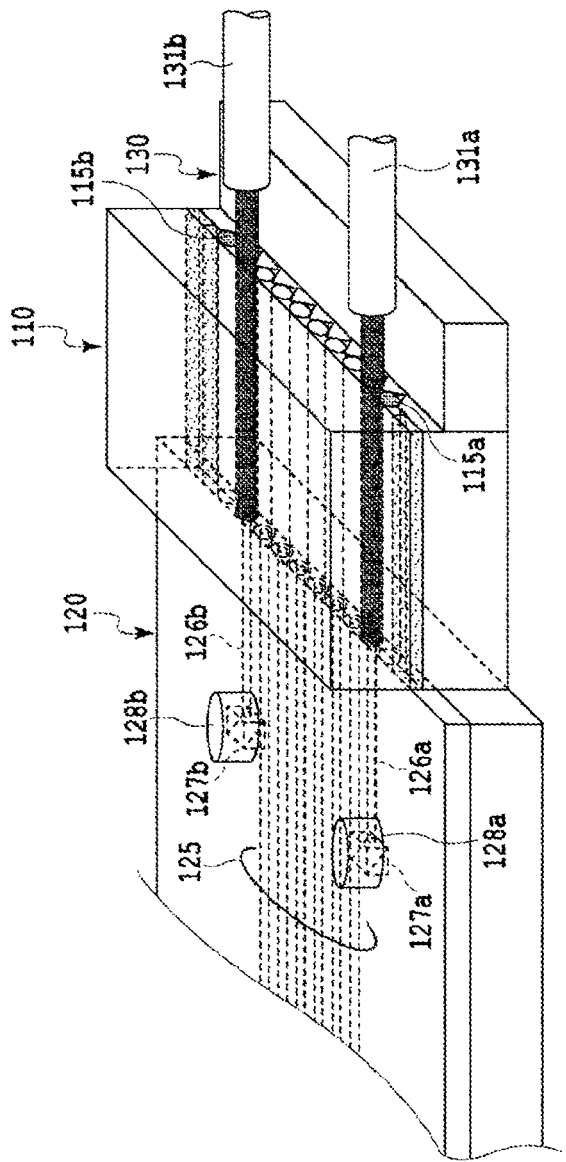
FIG. 7 is a diagram illustrating a method for performing optical alignment by causing light to enter the alignment optical fibers.
Figure 8:
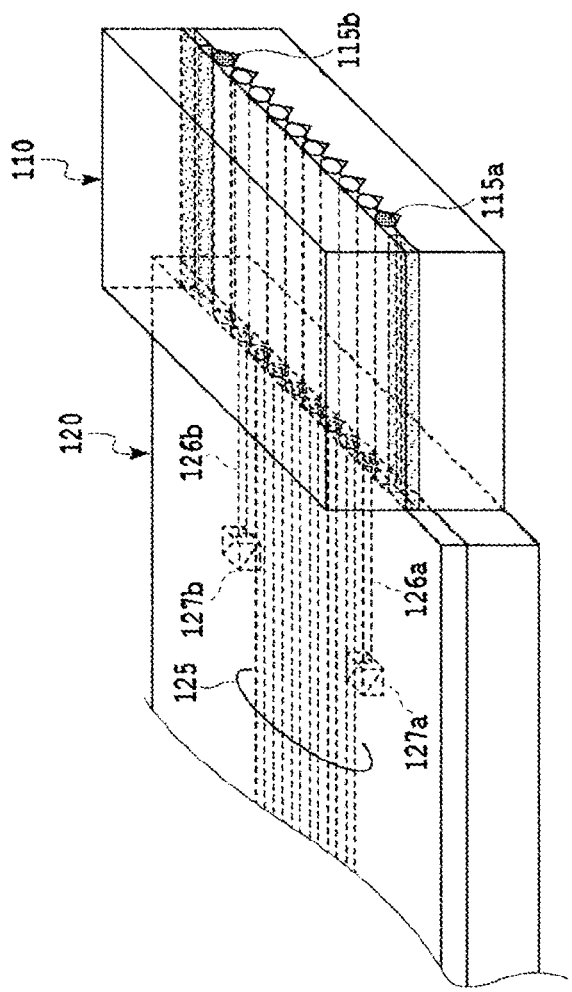
FIG. 8 is a diagram illustrating the optical waveguide device and the optical connection part for which optical alignment is complete.

The following will describe procedure for optically coupling the optical waveguide device and optical fibers with reference to FIGS. 6 to 8. As shown in FIG. 6, a fiber fixing base 130 is joined to the optical connection part 110 in advance, the core wires of alignment optical fibers 131a and 131b are inserted into predetermined guide holes of the optical connection part 110, and the coverings of the alignment optical fibers 131a and 131b are adhered and fixed to the fiber fixing base 130. The predetermined guide holes refer to guide holes that are opposed to, on the optical waveguide edge face of the optical waveguide device 120, the alignment optical waveguides 126.

Then, as shown in FIG. 7, light-receiving devices 128a and 128b are placed over the flip-up reflection mirrors 127a and 127b connected to the alignment optical waveguides 126a and 126b. The optical connection part 110 and the fiber fixing base 130 are attached to a holding/operating device, and the fiber edge face of the optical connection part 110 and the waveguide edge face of the optical waveguide device 120 are brought into intimate contact with each other. In this state, the implementer causes light to enter the alignment optical waveguides 126a and 126b from the alignment optical fibers 131a and 131b, and monitors, using the light-receiving devices 128a and 128b, the light intensities of the light exiting from the alignment optical waveguides 126a and 126.

At a position at which the light intensities detected by the light-receiving devices 128a and 128b are the highest, the optical waveguide device 120 and the optical connection part 110 are adhered and fixed to each other, and the optical alignment is ended. The implementer pulls out or cuts off the alignment optical fibers 131a and 131b, and removes the fiber fixing base 130, as shown in FIG. 8, and thereby completing the coupling between the optical waveguide device 120 and the optical connection part 110. In this way, the optical connection structure is obtained.

Then, by mounting the optical connection structure inside the package or on the printed circuit board, and then inserting the optical fiber core wires of the optical fiber array into the guide holes of the optical connection part 110, it is possible to optically couple the optical fiber array to the optical waveguide array 125 of the optical waveguide device 120.

According to the present embodiment, since light from the alignment optical waveguides 126a and 126b has been detected from the surface of the optical waveguide device 120, positioning needs only to be performed on the side on which light is incident, that is, on the optical connection part 110 side. Accordingly, the present embodiment can realize the optical alignment easily and at low cost. Also, as a result of the alignment optical waveguides 126a and 126 being arranged at both ends of the optical waveguide device 120 with the waveguide array 125 interposed therebetween, it is possible to accurately position the optical connection part 110. Furthermore, because, for detection of light from the alignment optical waveguides 126a and 126b, it is sufficient to observe relative light intensities, the flip-up mirrors 127 and the light receiving elements 128 do not need to be positioned with accuracy, and thus it is possible to easily measure the light intensities.

Note that in the present embodiment, light from the alignment optical waveguides 126a and 126b are detected from the surface of the optical waveguide device 120, but depending on the package structure of the optical transmitter or the optical receiver, the light may also be detected from the reverse side of the optical waveguide device 120 via the substrate 121.

Embodiment 2

Figure 9:
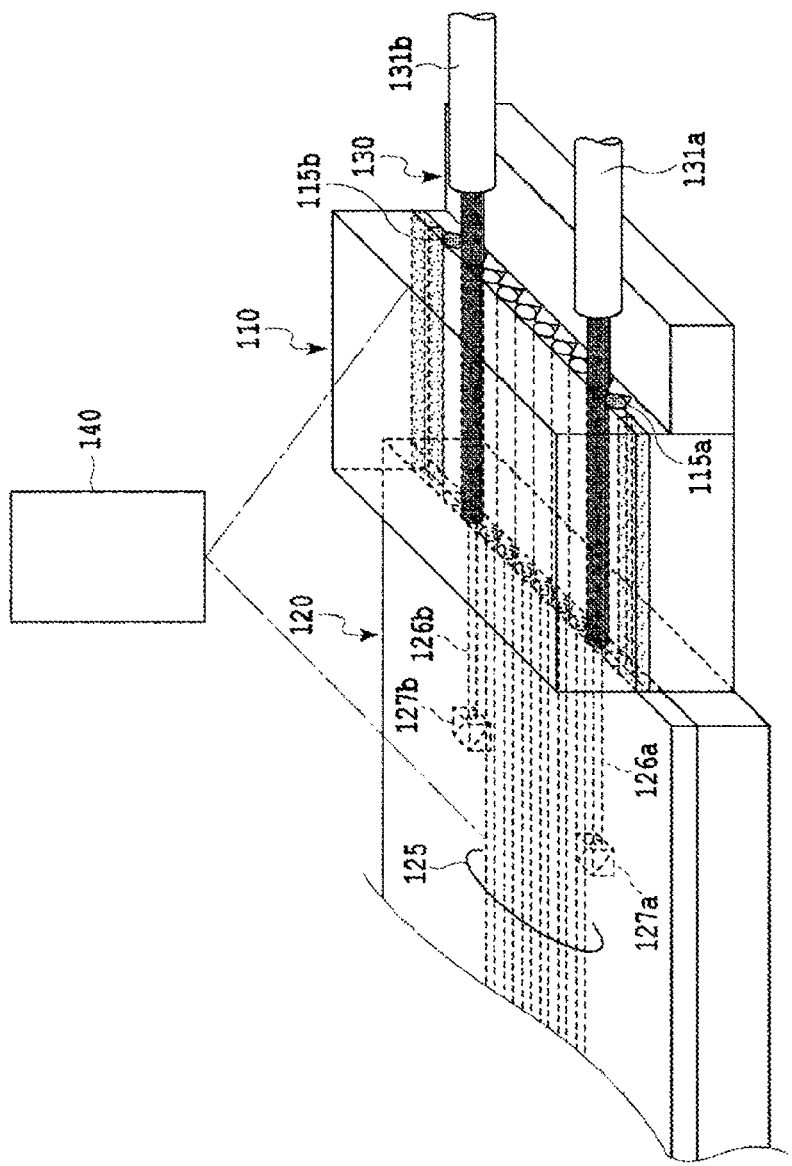
FIG. 9 is a diagram illustrating a method for connecting the optical waveguide device and optical fibers, according to Embodiment 2 of the present invention.

FIG. 9 shows a method for connecting the optical waveguide device and optical fibers according to Embodiment 2 of the present invention. In Embodiment 1, the light receiving elements 128 for use in optical alignment employ a photodiode. Embodiment 2 uses a microscope 140 that can receive light in the range from visible light to infrared light.

The implementer can monitor the light intensities of light exiting from the alignment optical waveguides 126a and 126b via the flip-up reflection mirrors 127a and 27b, and at the same time, the implementer can view the positions of the guide holes of the optical connection part 110 and the positions of the waveguide array 125 of the optical waveguide device 120. This makes the positioning easy. Furthermore, a reduction in the implementation cost can be expected. Also, even a microscope that can receive only visible light can be used to perform positioning with infrared light, if a fluorescent coating or the like is applied to the surface of the optical waveguide device 120 or the lens of the visible light microscope.

Embodiment 3

Figure 10:
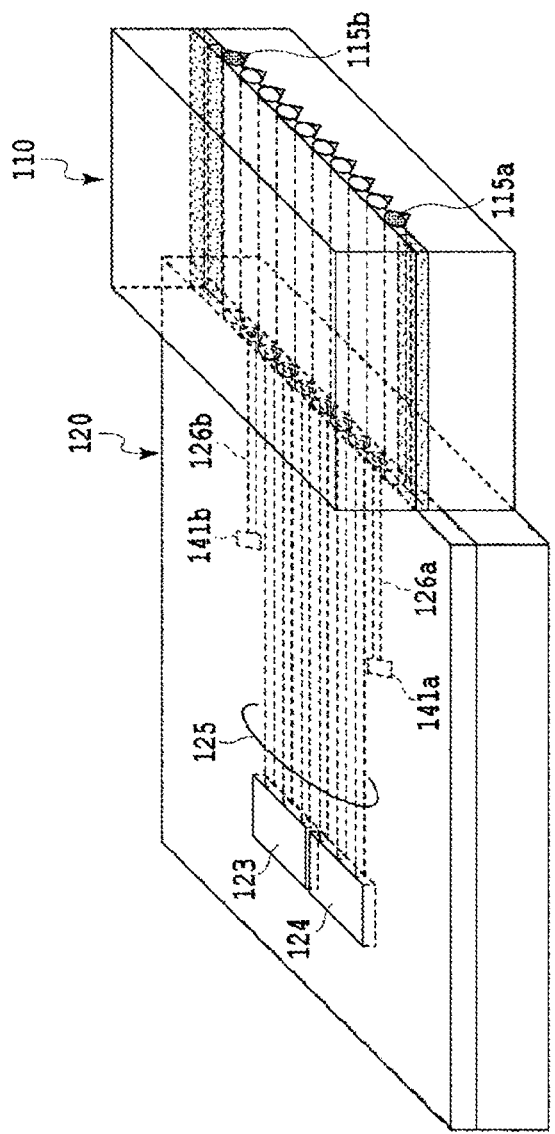
FIG. 10 is a diagram illustrating a method for connecting the optical waveguide device and optical fibers, according to Embodiment 3 of the present invention.

FIG. 10 shows a method for connecting the optical waveguide device and optical fibers according to Embodiment 3 of the present invention. Embodiment 3 uses scattering substances 141a and 141b, instead of the flip-up reflection mirrors 127a and 127b connected to the alignment optical waveguides 126a and 126b. The flip-up reflection mirrors 127a and 127b each constituted by an inclined surface of 45 degrees can reflect light exiting from the alignment waveguides 126a and 126b with low loss, and the light intensities detected by the light receiving elements 128 are high. However, an area in which the light can be received is small, which thus requires adjustment of the positions of the light receiving elements 128. In Embodiment 3, the scattering substances 141a and 141b can extensively scatter light, and thus easy positioning of the light receiving elements 128 is possible.

The scattering substances 141 need only to emit, from the surface of the optical waveguide device 120, an amount of light such that a change in the light intensity of the light exiting from the alignment optical waveguides 126 can be detected by the light receiving elements 128. As a simplified method for forming the scattering substances 141, it is conceivable to form a hole or a slit in the surface of the optical waveguide device 120 in the vertical direction so that it crosses the core of the alignment optical waveguides 126.

Therefore, instead of the mirrors or the scattering substances, any light path changing members may be used as long as they can change the path of light from the alignment optical fibers 131 to the vertical direction with respect to the optical axis direction of the cores of the alignment optical waveguides 126.

Embodiment 4

Figure 11:
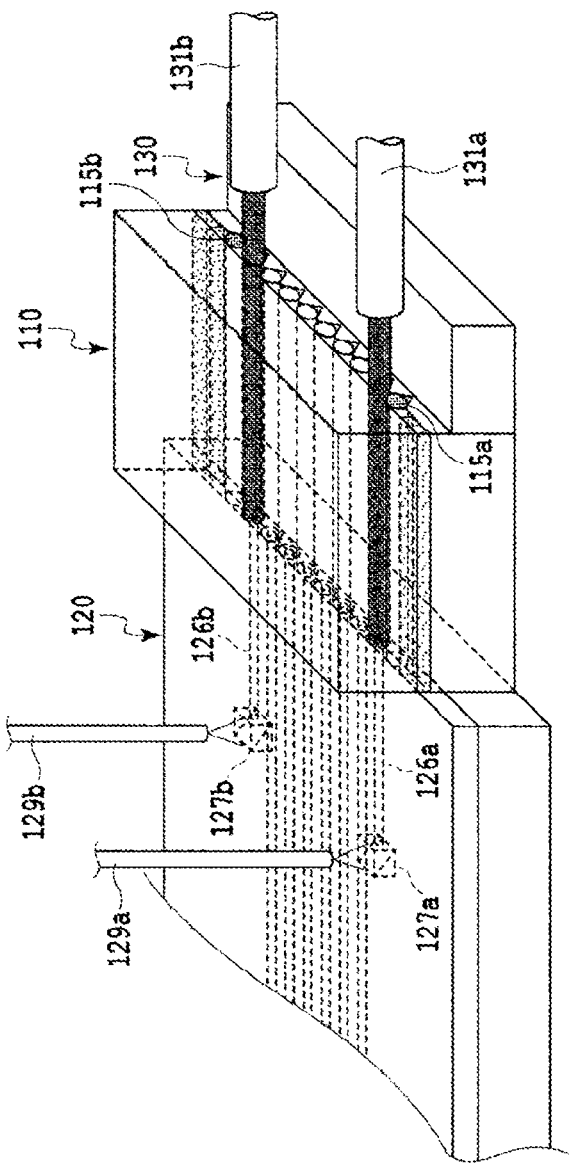
FIG. 11 is a diagram illustrating a method for connecting the optical waveguide device and optical fibers, according to Embodiment 4 of the present invention.

FIG. 11 shows a method for connecting the optical waveguide device and optical fibers according to Embodiment 4 of the present invention. In Embodiment 4, instead of the light receiving elements 128, light emitting elements 129a and 129b such as laser diodes are arranged above the flip-up reflection mirrors 127a and 127b. When performing optical alignment, the light intensities of light exiting from the alignment optical fibers 131a and 131b are monitored. In Embodiment 1, noise may occur in the light receiving elements 128 due to scattering of light that was not coupled to the waveguides. In Embodiment 4, most components of light that were not coupled to the waveguides are scattered before entering the optical connection part 110, and thus positioning is possible without lowering the accuracy.

REFERENCE SIGNS LIST 1, 110 Optical connection part
2, 120 Optical waveguide device
3 Guide hole
4 Optical waveguide
11, 111 V groove substrate
12, 112 Lid substrate
13 V groove
14 Adhesive
15, 115 Dummy fiber
21 Substrate
22 Optical waveguide
23 Core
24 Cladding
25 Reinforcing plate
31, 131 Alignment optical fiber
32 Plug
121 Si substrate
122 PLC
123 Transmitter array
124 Receiver array
125 Optical waveguide array
126 Alignment optical waveguide
127 Flip-up reflection mirror
128 Light receiving element
129 Light emitting element
130 Fiber fixing base
140 Microscope
141 Scattering substance

The invention claimed is:

1. An optical circuit in which optical waveguides to be connected to optical fibers are formed, comprising:
a first alignment optical waveguide longitudinally extending between a first end and an opposing second end and having a core with an optical axis direction, the second end of the first alignment optical waveguide being disposed at an optical waveguide edge face;
a first light path changing member disposed at the first end of the first alignment optical waveguide, the first light path changing member being configured to change a path of light extending along the optical axis direction of the core of the first alignment optical waveguide to a direction perpendicular to the optical axis direction of the core of the first alignment optical waveguide;
a second alignment optical waveguide longitudinally extending between a first end and an opposing second end and having a core with an optical axis direction, the second end of the second alignment optical waveguide being disposed at the optical waveguide edge face;
a second light path changing member disposed at the first end of the second alignment optical waveguide, the second light path changing member being configured to change a path of light extending along the optical axis direction of the core of the second alignment optical waveguide to a direction perpendicular to the optical axis direction of the core of the second alignment optical waveguide, the second light path changing member being separate and spaced apart from the first light path changing member; and
a waveguide array disposed between the first light path changing member and the second light path changing member and extending to the optical waveguide edge face.

2. The optical circuit according to claim 1, wherein the first light path changing member is an inclined surface of 45 degrees with respect to the optical axis direction of the core of the first alignment optical waveguide.

3. The optical circuit according to claim 1, wherein the first light path changing member is a scattering substance connected to the core of the first alignment optical waveguide.

4. The optical circuit according to claim 1, wherein no further light path changing member is disposed between the first light path changing member and the second light path changing member.

5. The optical circuit according to claim 1, further comprising a transmitter array and a receiver array coupled to the waveguide array.

6. The optical circuit according to claim 1, further comprising a light receiving element disposed above the first light path changing member.

7. A method for connecting the optical fibers to the optical circuit as recited in claim 1, the method comprising:
inserting a core wire of a first alignment optical fiber and a second alignment optical fiber into a first guide hole and a second guide hole, respectively, of an optical connection part, the optical connection part having a front face and an opposing back face with the first guide hole and the second guide hole extending therebetween;
placing a first light receiving device over the first light path changing member and a second light receiving device over the second light path changing member;
movably positioning the front face of the optical connection part directly against the optical waveguide edge face of the optical circuit;
transmitting light from the first alignment optical fiber and the second alignment optical fiber to the first alignment optical waveguide and the second alignment optical waveguide, respectively;
monitoring light intensities of the light exiting the first alignment optical waveguide and the second alignment optical waveguide using the first light receiving device and the second light receiving device while moving the optical connector part relative to the optical waveguide edge face; and
securely fixing the optical connection part to the optical waveguide edge face of the optical circuit when the optical connection part is positioned so that the monitored light intensities are the highest.

8. An optical connection structure for connecting an optical waveguide device and optical fibers, comprising:
an optical connection part having a front face and an opposing back face with a plurality of guide holes extending therebetween, the plurality of guide holes being configured for insertion of core wires of the optical fibers; and
an optical circuit including:
a first alignment optical waveguide longitudinally extending between a first end and an opposing second end and having a core with an optical axis direction, the second end being disposed at an optical waveguide edge face; and
a first light path changing member disposed at the first end of the first alignment optical waveguide, the first light path changing member being configured to change a path of light extending along the optical axis direction of the core of the first alignment optical waveguide to a direction perpendicular to the optical axis direction of the core of the first alignment optical waveguide, wherein the front face of the optical connector part is disposed directly against the optical waveguide edge face so that the first alignment optical waveguide is aligned with one of the plurality of guide holes of the optical connector part into which an alignment optical fiber is to be inserted.

9. The optical connection structure according to claim 8, wherein the first light path changing member is an inclined surface of 45 degrees with respect to the optical axis direction of the core of the first alignment optical waveguide.

10. The optical connection structure according to claim 8, wherein the first light path changing member is a scattering substance connected to the core of the first alignment optical waveguide.

11. The optical circuit according to claim 8, further comprising a light receiving element disposed above the first light path changing member.

12. The optical circuit according to claim 8, wherein the optical connector part is in optical alignment.

13. The optical connection structure according to claim 8, wherein the optical connector part further comprises:
 a lid substrate having an inside face with a plurality of first V grooves recessed therein; and
 a base substrate having an inside face with a plurality of second V grooves recessed therein, the lid substrate overlaying the base substrate so that the plurality of first V grooves align with the plurality of second V grooves so as to form the plurality of guide holes.

14. The optical connection structure according to claim 13, wherein a dummy fiber is disposed within a first one of the plurality of guide holes and a core wire of an optical fiber is disposed within a second one of the plurality of guide holes.

15. The optical connection structure according to claim 8, further comprising:
 a second alignment optical waveguide longitudinally extending between a first end and an opposing second end having a core with an optical axis direction, the second end of the second alignment optical waveguide being disposed at the optical waveguide edge face; and
 a second light path changing member disposed at the first end of the second alignment optical waveguide, the second light path changing member being configured to change a path of light extending along the optical axis direction of the core of the second alignment optical waveguide to a direction perpendicular to the optical axis direction of the core of the second alignment optical waveguide, the second light path changing member being separate and spaced apart from the first light path changing member.

16. The optical connection structure according to claim 15, further comprising a waveguide array disposed between the first light path changing member and the second light path changing member and extending to the optical waveguide edge face.

17. The optical circuit according to claim 8, wherein no further light path changing member is disposed between the first light path changing member and the second light path changing member.

18. The optical circuit according to claim 8, further comprising a transmitter array and a receiver array coupled to the waveguide array.

\* \* \* \* \*